(12) United States Patent
Divitt et al.

(10) Patent No.: US 11,689,821 B2
(45) Date of Patent: Jun. 27, 2023

(54) INCOHERENT FOURIER PTYCHOGRAPHIC SUPER-RESOLUTION IMAGING SYSTEM WITH PRIORS

(71) Applicant: The Government of the United States of America, as represented by the Secretary of the Navy, Arlington, VA (US)

(72) Inventors: Shawn Divitt, Gaithersburg, MD (US); Samuel Park, McLean, VA (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 147 days.

(21) Appl. No.: 17/386,005

(22) Filed: Jul. 27, 2021

(65) Prior Publication Data

US 2022/0046169 A1    Feb. 10, 2022

Related U.S. Application Data

(60) Provisional application No. 63/062,462, filed on Aug. 7, 2020.

(51) Int. Cl.
| | |
|---|---|
| *H04N 5/265* | (2006.01) |
| *G02B 21/36* | (2006.01) |
| *H04N 23/951* | (2023.01) |
| *H04N 23/56* | (2023.01) |

(52) U.S. Cl.
CPC ......... *H04N 23/951* (2023.01); *H04N 5/265* (2013.01); *H04N 23/56* (2023.01)

(58) Field of Classification Search
CPC ....... H04N 23/951; H04N 23/56; H04N 5/265
See application file for complete search history.

(56) References Cited

U.S. PATENT DOCUMENTS

| | | |
|---|---|---|
| 5,774,221 A | 6/1998 | Guerra |
| 9,817,224 B2 | 11/2017 | Zheng et al. |
| 10,679,763 B2 | 6/2020 | Zheng et al. |
| 10,983,328 B2 | 4/2021 | Ouichi et al. |
| 11,307,398 B2* | 4/2022 | Haase ................. G02B 21/125 |
| 11,561,383 B2* | 1/2023 | Putman ............... G02B 21/125 |

(Continued)

OTHER PUBLICATIONS

Guo et al. "Fourier Ptychography for Brightfield, Phase, Darkfield, Reflective, Multi-Slice and Fluorescence Imaging", IEEE Journal of Selected Topics in Quantum Electronics, vol. 22, No. 4, Aug. 2016.*

(Continued)

*Primary Examiner* — James T Boylan
(74) *Attorney, Agent, or Firm* — US Naval Research Laboratory; Joslyn J. Barritt

(57) ABSTRACT

An Incoherent Fourier ptychographic imaging system. Multiple known light patterns are projected sequentially onto a target and images of the combined pattern and target are recorded by a camera, with the images being processed using an optical transfer function (OTF). The camera and projection system are aligned along the same optical axis. The known illumination patterns and the optical transfer function (OTF) are combined in an iterative algorithm to generate an image with resolution greater than would be achieved by uniform illumination of the target and imaging with the camera.

1 Claim, 4 Drawing Sheets

(56) References Cited

U.S. PATENT DOCUMENTS

| | | | |
|---|---|---|---|
| 2015/0160450 A1* | 6/2015 | Ou | G02B 21/365 348/80 |
| 2016/0088205 A1* | 3/2016 | Horstmeyer | G02B 21/367 348/80 |
| 2016/0178883 A1* | 6/2016 | Horstmeyer | G02B 21/367 348/80 |
| 2016/0266366 A1* | 9/2016 | Chung | G02B 21/008 |
| 2017/0235117 A1* | 8/2017 | Putman | G02B 21/125 348/49 |
| 2018/0048811 A1 | 2/2018 | Waller et al. | |
| 2018/0284418 A1* | 10/2018 | Cohen | G02B 21/0056 |
| 2018/0314045 A1* | 11/2018 | Bernal Arango | G02F 1/292 |
| 2019/0004304 A1* | 1/2019 | Gaiduk | G02B 21/10 |
| 2022/0413276 A1* | 12/2022 | Anderson | G02B 21/082 |

OTHER PUBLICATIONS

Pacheco et al. "Reflective Fourier Ptychography", Jounal of BiomedicalOptics, Feb. 2016.*

M.G.L. Gustafsson, "Surpassing the lateral resolution limit by a factor of two using structured illumination microscopy," Journal of microscopy, 198 (2): 82-87 (2000).

Gergely Huszka et al., "Super-resolution optical imaging: A comparison," Micro and Nano Engineering 2 (2019): 7-28.

P. C. Konda, et al., "Fourier ptychography: current applications and future promises," Opt. Express, vol. 28, pp. 9603-9630, Mar. 2020.

S. Dong et al., "Incoherent Fourier ptychographic photography using structured light," Photon. Res., vol. 3, pp. 19-23, Feb. 2015.

Z. Xie, et al., "Translation position extracting in incoherent Fourier ptychography." arXiv: Image and Video Processing (2019).

A. Daniels, et al., "Random transparency targets for modulation transfer function measurement in the visible and infrared regions," Optical Engineering 34(3), 860-868 (Mar. 1995).

J.M. Guerra, "Super-resolution through illumination by diffraction-born evanescent waves," Appl. Phys. Lett. 66, 3555 (1995).

* cited by examiner

S. Dong, P. Nanda, K. Guo, J. Liao, and G. Zheng, "Incoherent fourier ptychographic photography using structured light," Photon. Res., vol. 3, pp. 19–23, Feb. 2015.

| target | uniform illumination | structured illumination |
|---|---|---|
| 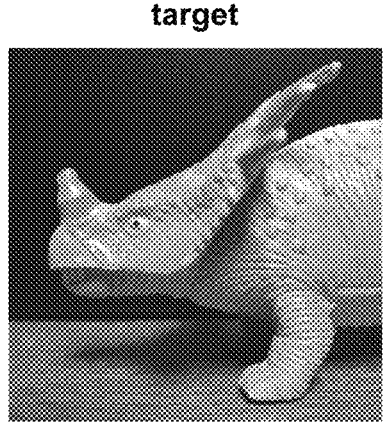 | 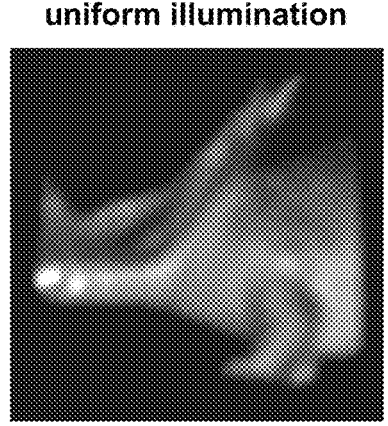 | 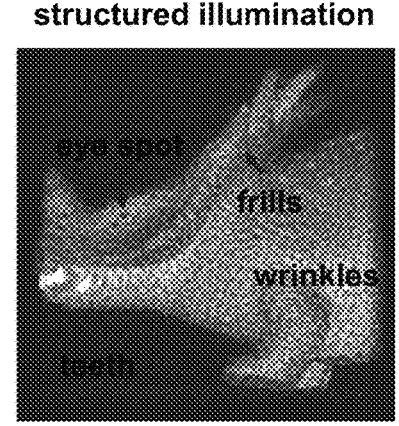 |
| FIG. 4A | FIG. 4B | FIG. 4C |

INCOHERENT FOURIER PTYCHOGRAPHIC SUPER-RESOLUTION IMAGING SYSTEM WITH PRIORS

CROSS-REFERENCE

This Application is a Nonprovisional of and claims the benefit of priority under 35 U.S.C. § 119 based on U.S. Provisional Patent Application No. 63/062,462 filed on Aug. 7, 2020. The Provisional Application and all references cited herein are hereby incorporated by reference into the present disclosure in their entirety.

FEDERALLY SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #113277-US2.

TECHNICAL FIELD

The present disclosure relates to an apparatus and method for imaging distant objects, particularly imaging of distant objects at resolutions that exceed the diffraction limit of the camera.

BACKGROUND

Passive imaging is fundamentally limited in resolution by the optics on the camera. This limit can be surpassed through active illumination imaging techniques such as structured illumination, which enhance the resolution of the imaging camera. See M. G. L. Gustafsson, "Surpassing the lateral resolution limit by a factor of two using structured illumination microscopy," *Journal of microscopy*, 198 (2): 82-87 (2000). Systems that already use active illumination, such as night-vision systems, can benefit substantially from resolution enhancement techniques without changing their use-cases.

It is desirable to augment active-illumination night-vision systems with the goal of increasing spatial resolution. Many super-resolution techniques are known that could accomplish this goal. See, e.g., Gergely Huszka et al., "Super-resolution optical imaging: A comparison," *Micro and Nano Engineering* 2 (2019): 7-28—and P. C. Konda, et al, "Fourier ptychography: current applications and future promises," *Opt. Express*, vol. 28, pp. 9603-9630, March 2020. Among the various techniques, structured illumination and Fourier ptychography stand out as active, linear methods that may be capable of high speed operation at long range.

Recent work has shown that Fourier ptychography can be accomplished under incoherent illumination with an iterative image-processing algorithm, which allows for the recovery of both a high-resolution image and an illumination pattern through a priori knowledge of both the optical transfer function (OTF) and the translation of a scattering surface. See S. Dong et al., "Incoherent Fourier ptychographic photography using structured light," *Photon. Res.*, vol. 3, pp. 19-23, February 2015; and Z. Xie, et al., "Translation position extracting in incoherent Fourier ptychography." *arXiv: Image and Video Processing* (2019).

The block schematic in FIG. 1 illustrates an exemplary configuration of a conventional Fourier ptychographic imaging system in accordance with the prior art. As shown in FIG. 1A, such as conventional imaging system includes an active illumination unit 101 comprising a diffuser scanning apparatus 101a and a CCD imager 101b. The diffuser scanning apparatus 101 projects the rough, illuminated surface (diffuser) 101a through a lens onto the object 102 and records an image using the CCD imager 101b. This projection and image recording is repeated for many translated positions of the diffuser such that an ensemble of images of the object is created. Combining this ensemble with prior knowledge of the OTF and the translated positions in the image-processing algorithm of Dong et al. allows for high-resolution image recovery.

However, this method requires slow, physical translation of a diffuser and applies only to two-dimensional, flat objects, and a faster, more robust method is required for imaging of three-dimensional and moving objects.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides an improved Fourier ptychographic imaging system. In contrast to prior art ptychographic imaging systems which project an unknown scattering image on a plurality of locations on the surface of a target to be imaged and reconstruct the image from a corresponding plurality of multiple detected images using a reconstruction algorithm, in the imaging system in accordance with the present invention, the same algorithm is used to image objects at a distance without the time-costly translation of a scattering surface. Instead, in accordance with the present invention, a plurality of pre-computed, known patterns, referred to herein as "priors," are projected onto the target without the need for spatial translation of the patterns on the surface. The target image with the projected image superimposed thereon is received by an imaging system and the combined image is processed using a reconstruction algorithm. Through co-alignment and registration of the projection and imaging optics, such a system is capable of performing at high speed over significant distances.

BRIEF DESCRIPTION OF THE DRAWINGS

FIGS. 4A-4C photographic images illustrating the improved imaging of a three-dimensional object obtained using a Fourier ptychographic imaging system in accordance with the present invention.

DETAILED DESCRIPTION

Figure 1:
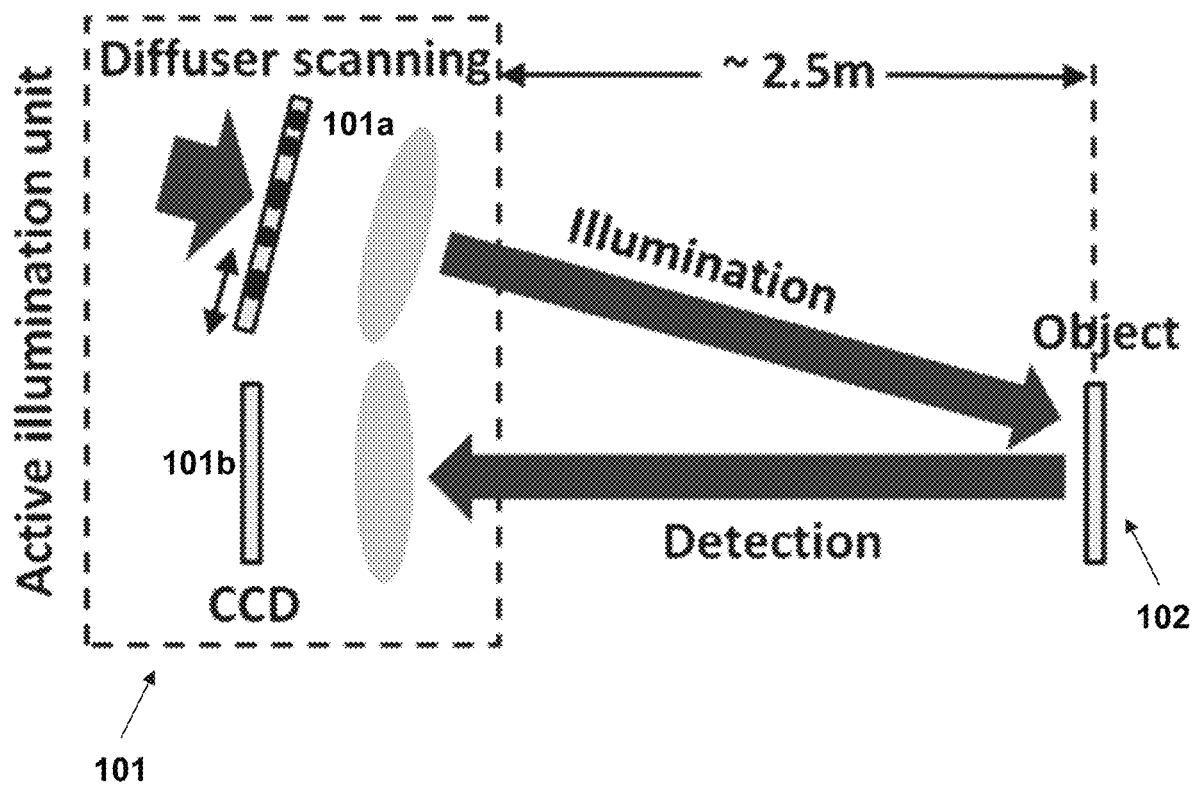
FIG. 1 is a block schematic illustrating aspects of an exemplary Fourier ptychographic imaging system in accordance with the prior art.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

As described in more detail below, the present invention uses incoherent structured light patterns to illuminate a target. Multiple known light patterns are projected sequentially onto a target and images of the combined pattern and target are recorded by a camera, with the images being processed using an optical transfer function (OTF). The camera and projection system are aligned along the same optical axis. The known illumination patterns and the optical transfer function (OTF) are combined in an iterative algorithm to generate images having a resolution greater than can be achieved via uniform illumination of the target and imaging with the camera.

This is particularly notable when imaging three-dimensional objects.

In the ptychographic Fourier imaging system developed by Dong described above with reference to FIG. 1, a three-dimensional object will cause unacceptable distortion of the projected pattern, preventing an accurate image of the object from being recovered using simple prior knowledge such as that a pattern was translated over the target as in the Dong system. In contrast, as described below, in the system and method of the present invention, the registration between the projected pattern and the camera can be pre-calibrated with high precision using the apparatus configuration shown in FIG. 2, because a projected pixel will always be seen in the same place on the camera for any distance to the target and focus of the camera optics. While registration can still be accomplished using the Dong apparatus, it must be extracted in situ from the data of the images and results in more noise and lower resolution of the final recovered image, whereas the robust calibration of the apparatus in accordance with the present invention enables the recovery of much more accurate images of three-dimensional objects.

Thus, before a target is imaged, in the system and method of the present invention, the pixels of the projector and the detector are registered using a calibration procedure. In an exemplary calibration procedure, a set of single pixels are illuminated and projected onto a calibration target, such as a blank white wall, and the calibration target is imaged by the camera. Each projector pixel generates a unique spot in the image plane of the camera via the calibration target. The centroid camera pixel is found for each spot, with sub-pixel precision. Combining all such images, a map is found between camera and projector pixels using a piecewise-linear geometric transformation. Projected patterns are computationally warped, using this transformation in conjunction with spline interpolation, to create each nth projection $P_n$. This calibration procedure also allows for measurement of the OTF by dividing the Fourier transform of measured, random patterns by the Fourier transform of the projected patterns. An ensemble average of these divided patterns, combined with a window function to reject spurious high spatial frequencies, gives a direct measurement of the complex-valued OTF, and this procedure can be used over subdivided regions of the image plane to measure a spatially varying OTF, if necessary.

Figure 2:
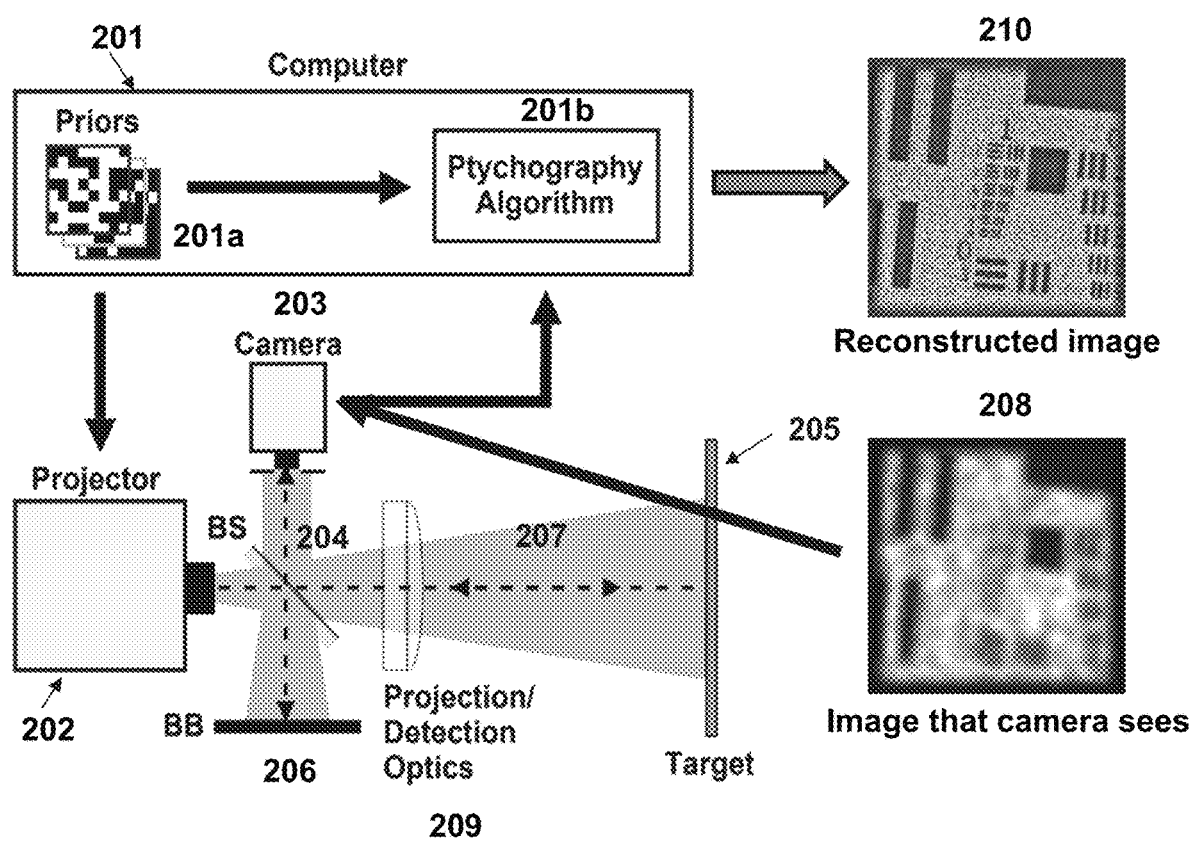
FIG. 2 is a block schematic illustrating aspects of an exemplary embodiment of a Fourier ptychographic imaging system in accordance with the present invention.

The block schematic in FIG. 2 illustrates an exemplary embodiment of an apparatus setup that can be used in an Incoherent Fourier ptychographic super-resolution imaging system in accordance with the present invention. As described in more detail below, this system uses predetermined patterns, which are not required to be correlated with each other, with co-aligned projection and image recording devices. These predetermined patterns can be changed at very high speeds relative to previous systems, and do not require translation or rotation of a single pattern. The system can also be used with three-dimensional objects, unlike previous systems.

Thus, as illustrated in FIG. 2, an apparatus that can be used for an Incoherent Fourier ptychographic super-resolution imaging method in accordance with the present invention can include a computer 201 coupled to a projector 202 and a camera 203, and can further include a beam splitter 204 and projection detection optics 209. In the method according to the present invention, a plurality of known patterns 201a (often referred to herein as "priors") are generated by computer 201 and are sequentially projected onto a target 205 to be imaged. The prior patterns 201a are projected onto the target via projector 202 through beam splitter 204 and projection/detection optics 209, where the beam splitter directs a portion of the light from the projector onto the target, with the remaining light being directed towards beam block 206, which absorbs light that passes through the beam splitter rather than being directed to the target so that it doesn't reflect back to the camera.

For each projected prior 201a, target 205 with the corresponding prior superimposed thereon is then imaged by means of a detection element in projection/detection optics 209 to produce a combined image at camera 203.

The paths of light from projector 202 to target 205 and of the combined images 208 back to projection/detection optics 209 are aligned such that they share the same optical axis 207. This co-alignment ensures that the perspectives of both the projected prior 201a and received image 208 are identical, enabling robust calibration of the system and imaging of three-dimensional objects.

As noted above, in the method of the present invention, multiple priors 201a are projected onto target 205 and multiple combined images 208, each comprising an image of the target and a corresponding prior, are received by the camera and input into the computer. The combined pattern/target images are then iteratively processed using the Fourier ptychography algorithm 201b described below to generate high-resolution reconstructed images 210 from the set of lower resolution images 208.

The ptychography algorithm utilized by the computer is based on the algorithm originally described in Dong et al., supra, except that in the method of the present invention, the pattern projected onto the target as part of the image is known, whereas in the Dong algorithm, the projected pattern is generated from scatter resulting from physical surface roughness that is mechanically translated and projected onto the target.

Thus, in the algorithm as used in the method of the present invention, we let $P_n$ be the n-th known projected pattern mapped onto the camera detector plane, $I_n$ be the corresponding image recorded by the camera, T be the OTF of the camera, and $I_g$ be the best guess for the true image of the target. We assume that T is approximately spatially invariant, although a spatially variant T could be accommodated by subdividing each recorded image $I_n$ into m subsections and replacing T with $T_m$ representing the m-th OTF as appropriate for the given position in the field of the optical system of the camera.

The guess, $I_g$, is iteratively updated, with n=1, 2, 3, . . . , N, by the series of steps shown in Equations (1)-(3) below:

$$A_n = I_g P_n \quad (1)$$

$$B_n = \mathcal{F}^{-1}\{\widetilde{A_n} + T(\widetilde{I_n} - T\widetilde{A_n})\} \quad (2)$$

$$I'_g = I_g + \alpha \frac{P_n}{\max(P_n)^2}(B_n - A_n), \quad (3)$$

where each tilde implies a 2-dimensional Fourier transform, $\mathcal{F}^{-1}$ is an inverse 2-dimensional Fourier transform, all multiplication is element-wise-, and $I_g'$ is the updated guess that is used in the next iteration as $I_g$. The parameter $\alpha$ is a gain parameter; it takes the constant value of $\alpha=1$ in Dong et al. but can be modified as appropriate to change the convergence rate and noise of the algorithm's output, $I_g$. After cycling through each recorded image, the updating procedure can be repeated by returning to n=1 and iterating again until a final reconstructed image 210 of the original target is obtained.

Figure 3A:
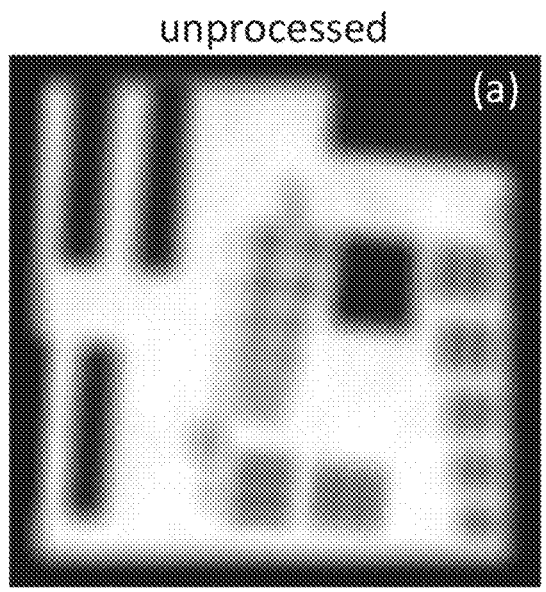
FIGS. 3A-3C are photographic images illustrating the improved imaging of a two-dimensional object obtained using a Fourier ptychographic imaging system in accordance with the present invention.
Figure 3B:
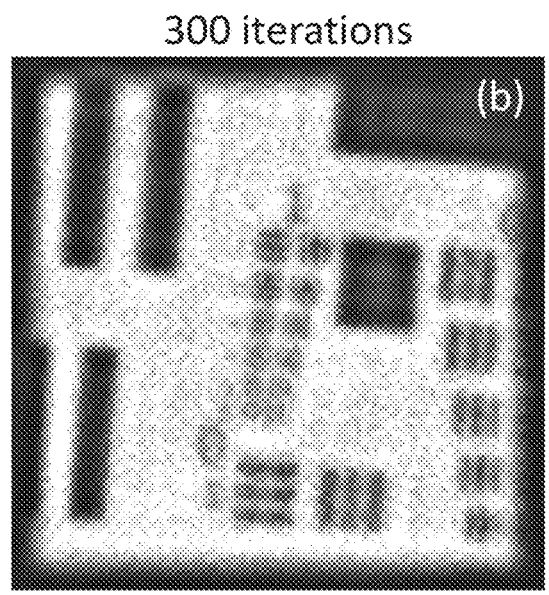
Figure 3C:
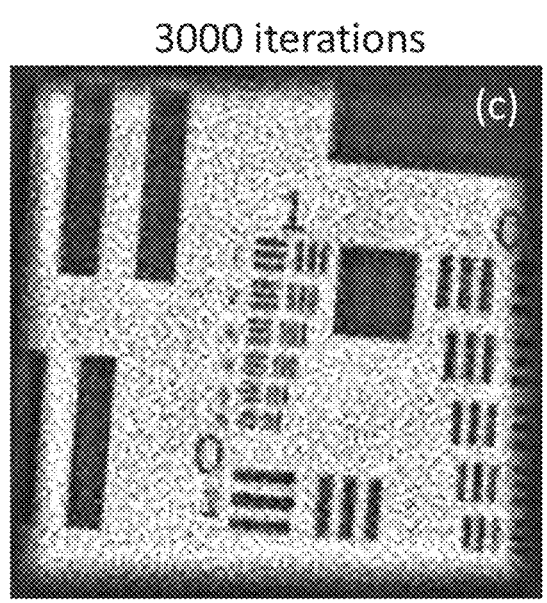

The photographic images in FIGS. 3A-3C illustrate the improved imaging that can be obtained using the Fourier ptychographic imaging system and method in accordance with the present invention. To obtain the images shown in FIGS. 3A-3C, 300 known illumination patterns were randomly projected onto a standard U.S. Air Force 1951 test target on white paper and the images were iteratively processed according to the ptychographic imaging algorithm in Equations (1)-(3) described above.

FIG. 3A is an ensemble average image recorded by the camera, which combines the recorded intensities of the target and the 300 random projected patterns, before the ptychographic imaging is applied. FIG. 3B shows a recovered image obtained after applying the algorithm of Equations (1)-(3) to the detected images from all of the 300 patterns projected onto the target. The recovered image shown in FIG. 3C was obtained by applying the algorithm 10 times to each of the 300 projected patterns, for a total of 3000 cycles. We use a USAF target where the standard relations between the numbered groups and elements can be used to approximate the enhancement in resolution. While only the largest bars shown in FIG. 3A are resolved, corresponding to group 2 elements 3 and 4, all of the elements in group 0 are resolved in FIG. 3B, and all of the elements in group 1 are resolved in FIG. 3C. Given that USAF bar target group 0 element 1 is unresolved in FIG. 3A while group 1 element 6 is resolved in FIG. 3C, this corresponds to a resolution enhancement factor of at least 3.5.

The Fourier ptychographic imaging system and method in accordance with the present invention can also provide improved imaging of three-dimensional objects.

FIGS. 4A-4C illustrate the improved imaging of three-dimensional objects that can be obtained using the system and method of the present invention. FIG. 4A shows an exemplary three-dimensional target to be imaged, in this case, a miniature plastic dinosaur model. Using conventional imaging, an image such as that shown in FIG. 4B is obtained, in which the image of the object is blurry and details of its surface are undefined and not detected. In contrast, using the Fourier ptychographic imaging system and method in accordance with the present invention, an image such as that shown in FIG. 4C is obtained, which clearly shows surface features of the dinosaur model, including the teeth, the eye spot, wrinkled skin on the legs, and frills on its head.

Advantages and New Features

Instead of illumination patterns generated from scattering caused by physical surface roughness that are mechanically translated and projected onto the target as in conventional Incoherent Fourier ptychographic imaging methods, in the Fourier ptychographic imaging method in accordance with the present invention, known pre-computed patterns are projected onto the target by the projector.

The pre-computed illumination patterns (priors) used in accordance with the present invention do not require any mutual relation, such as translation or rotation, which was a common requirement of previous methods, although such mutual relations can be accommodated by this method. For example, the experimental realization shown in FIGS. 3A-3C uses a random pattern sequence with zero correlation between successive patterns.

The illumination pattern projector is synchronized with the camera for fast acquisition. This fast acquisition enables high-speed and sensitive background subtraction, which further enables operation in realistic, outdoor environments.

Alternatives

The camera and projector can have separate optics, or share the same imaging optics, or both. For example, the exemplary apparatus configuration shown in FIG. 1 gives the "both" case, with imaging optics both before and after the beam-splitter. Sharing the same imaging optics allows for fixed and accurate registration of the detector array with the projector without the calibration step.

The projected patterns as well as the sequence can be arbitrary. Random patterns could be replaced or interspersed with, for example, sinusoidal patterns or Hadamard patterns.

The disclosed invention demonstrates a method of using arbitrarily structured illumination in Incoherent Fourier ptychography, which enables utilization of optimal patterns that leads to faster acquisition and reconstruction of enhanced resolution images.

Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein. The present application contemplates any and all modifications within the spirit and scope of the underlying invention described and claimed herein, and all such modifications and alternative embodiments are deemed to be within the scope and spirit of the present disclosure.

What is claimed is:

1. A method for imaging a target object, comprising the steps of:
    (a) using a projector, projecting a predefined pattern onto a target object to be imaged;
    (b) generating, at a detector plane of a camera, a combined image comprising an image of the object and the projected image of the predefined pattern superimposed thereon;
    (c) receiving data representing the combined image at a processor coupled to the camera and the projector and generating a guess $I_g$ of a reconstructed image of the target object using an algorithm in which
        $P_n$ is an n-th projected pattern mapped onto the camera detector plane,
        $I_n$ is a corresponding image recorded by the camera,
        T is an optical transfer function of the camera, and
        $I_g$ is a guess for the true image of the target; and
    (d) repeating steps (a)-(c) n=1, 2, 3, . . . , N times;

wherein $I_g$ is iteratively updated to an updated guess $I_g'$ by an updating procedure consisting of a series of steps in which $$I_g' = I_g + \alpha \frac{P_n}{\max(P_n)^2}(B_n - A_n),$$

$$A_n = I_g P_n, \text{ and}$$

$$B_n = \mathcal{F}^{-1}\{\widetilde{A_n} + T(\widetilde{f_n} - T\widetilde{A_n})\},$$

where each tilde implies a 2-dimensional Fourier transform, $\mathcal{F}^{-1}$ is an inverse 2-dimensional Fourier transform, all multiplication is element-wise, $I_g'$ is the updated guess that is used in the next iteration as $I_g$, and $\alpha$ is a predefined gain parameter; and wherein the updating procedure is repeated by returning to n=1 and iterating again until a final reconstructed image of the target is obtained.

* * * * *